UNITED STATES PATENT OFFICE.

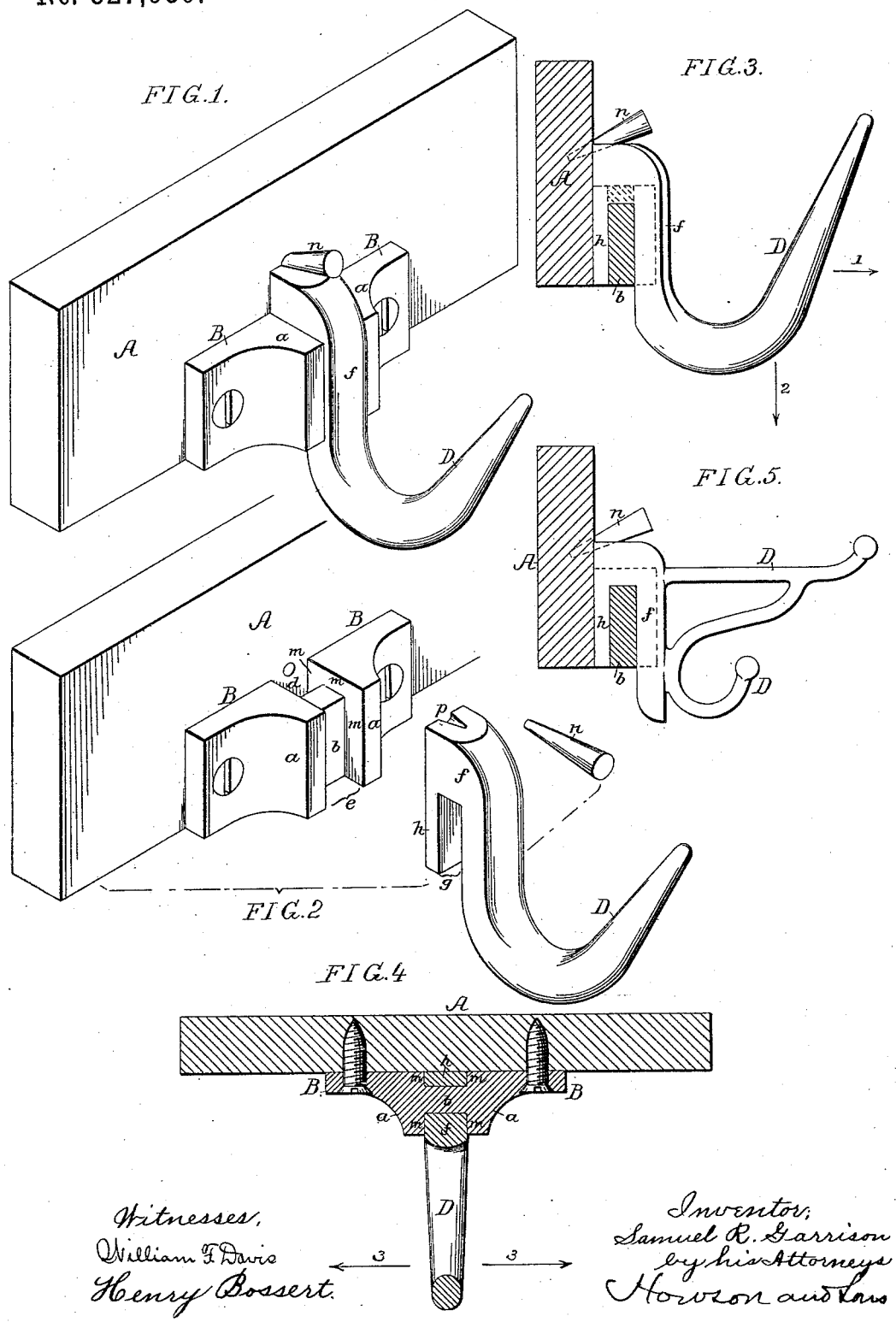

SAMUEL R. GARRISON, OF CAMDEN, NEW JERSEY, ASSIGNOR OF ONE-HALF TO RANDOLPH E. BENDER, OF PHILADELPHIA, PENNSYLVANIA.

DETACHABLE SUSPENSION-HOOK.

SPECIFICATION forming part of Letters Patent No. 327,939, dated October 6, 1885.

Application filed May 25, 1885. Serial No. 166,550. (No model.)

*To all whom it may concern:*

Be it known that I, SAMUEL R. GARRISON, a citizen of the United States, and a resident of Camden, New Jersey, have invented certain Improvements in Detachable Suspension-Hooks, of which the following is a specification.

The object of my invention is to so construct a hook and bracket that the hook can be readily detached from the bracket, but when applied thereto will be rigidly supported against lateral as well as outward or direct downward strain.

In the accompanying drawings, Figure 1 is a perspective view of a meat-hook constructed in accordance with my invention; Fig. 2, a similar view showing the hook detached from the bracket; Fig. 3, a sectional view with the hook in elevation; Fig. 4, a sectional plan view, and Fig. 5 a sectional view showing my invention applied to a coat-hook.

A represents part of a bar or other support to which the hook is to be attached, and B a bracket secured to this bar, said bracket comprising opposite wings $a$ $a$, with openings for the confining screws or bolts, these wings being connected by a bridge-piece, $b$, which is discontinued some distance from the top of the bracket, and is so contracted in thickness, as compared with the wings, that a recess, $d$, is formed between the inner side of the bridge-piece and the surface of the bar A, a like recess, $e$, being formed in the outer portion of the bracket.

The shank $f$ of the hook D has in it a recess, $g$, thus forming a rear finger, $h$. When the hook is applied to the bracket, the recess $g$ receives the bridge-piece $b$, the finger $h$ being adapted to the recess $d$, and the front portion of the shank $f$ being contained in the recess $e$. The bridge-piece $b$ thus provides a rigid support for the hook as against strains in the direction of the arrows 1 2, Fig. 3, while the shoulders $m$, formed by the projecting side wings, $a$, of the bracket, effectually brace the hook against lateral strain in the direction of the arrows 3, Fig. 4.

Accidental displacement of the hook is prevented by means of a pin, $n$, adapted to enter an opening in the bar A, and to a recess, $p$, in the top of the shank $f$ of the hook.

The finger $h$ of the hook extends to the bottom of the bracket, so that the hook can be readily driven from the bracket by means of a suitable punch acting upon the lower end of said finger, thus overcoming the difficulty which is experienced in removing an ordinary detachable hook after it has become rusted to its seat in the bracket.

The bridge-piece $b$ may, if desired, extend to the top of the bracket, as shown by dotted lines in Fig. 3; but it is preferable to discontinue said bridge-piece some distance from the top of the bracket, in order to increase the area of the retaining-shoulders presented by the wings $a$.

My invention is applicable to coat hooks or hangers as well as to meat-hooks, as will be understood by reference to Fig. 1.

I claim as my invention—

1. The combination of the bracket having a connecting bridge-piece, and side wings forming shoulders $m$ in front and rear of the same, with a hook the shank of which is recessed to fit said bridge-piece, so as to form front and rear fingers confined laterally by the shoulders of the bracket, as set forth.

2. The combination of a bracket having side wings and a connecting bridge-piece the top of which is below the top of the bracket, whereby said side wings form shoulders above as well as in front and rear of the bridge-piece, with a hook the shank of which is recessed to fit the bridge-piece, and is retained laterally by said shoulders, as set forth.

3. The combination of the bracket having opposite side wings and a connecting bridge-piece, with the hook the shank of which is recessed to fit said bridge-piece, the rear finger, $h$, of the shank extending to the bottom of the bracket, as specified.

4. The bracket B, having opposite wings $a$ and a connecting bridge-piece, $b$, said wings forming lateral retaining-shoulders $m$ in front and rear of the bridge-piece, as set forth.

In testimony whereof I have signed my name to this specification in the presence of two subscribing witnesses.

SAMUEL R. GARRISON.

Witnesses:
 HENRY BOSSERT,
 HARRY SMITH.